US011392370B2

(12) United States Patent
Cabrera Lozoya et al.

(10) Patent No.: US 11,392,370 B2
(45) Date of Patent: Jul. 19, 2022

(54) DISTRIBUTED VECTORIZED REPRESENTATIONS OF SOURCE CODE COMMITS

(71) Applicant: SAP SE, Walldorf (DE)

(72) Inventors: Rocio Cabrera Lozoya, Antibes (FR); Antonino Sabetta, Mouans Sartoux (IT); Michele Bezzi, Le Haut Sartoux Valbonne (IT); Arnaud Baumann, Juan les pins (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/080,520

(22) Filed: Oct. 26, 2020

(65) Prior Publication Data

US 2022/0129261 A1 Apr. 28, 2022

(51) Int. Cl.
| G06F 9/44 | (2018.01) |
| G06F 8/71 | (2018.01) |
| G06F 16/25 | (2019.01) |
| G06N 20/00 | (2019.01) |
| G06F 8/40 | (2018.01) |

(52) U.S. Cl.
CPC .............. *G06F 8/71* (2013.01); *G06F 8/40* (2013.01); *G06F 16/258* (2019.01); *G06N 20/00* (2019.01)

(58) Field of Classification Search
CPC . G06F 8/71; G06F 16/258; G06F 8/40; G06F 8/42; G06N 20/00
USPC ........................................................ 717/121
See application file for complete search history.

(56) References Cited

U.S. PATENT DOCUMENTS

| 2017/0212829 | A1* | 7/2017 | Bales ................. G06F 11/3612 |
| 2017/0364826 | A1* | 12/2017 | Mitarai ................. G06N 20/00 |
| 2019/0303158 | A1* | 10/2019 | Brar ........................ G06F 8/658 |
| 2019/0347424 | A1* | 11/2019 | Bezzi ..................... G06F 21/577 |
| 2020/0057858 | A1* | 2/2020 | Sharma ................. G06N 20/00 |
| 2020/0225944 | A1* | 7/2020 | Wright ...................... G06F 8/77 |
| 2021/0034965 | A1* | 2/2021 | Tan ......................... G06F 17/16 |
| 2021/0247976 | A1* | 8/2021 | Masis ........................ G06F 8/71 |

(Continued)

OTHER PUBLICATIONS

Title: On the classification of software change messages using multi-label active learning author: S Gharbi, published on 2019.*

(Continued)

*Primary Examiner* — Chameli Das
(74) *Attorney, Agent, or Firm* — Fountainhead Law Group P.C.

(57) ABSTRACT

Distributed vector representations of source code commits, are generated to become part of a data corpus for machine learning (ML) for analyzing source code. The code commit is received, and time information is referenced to split the source code into pre-change source code and post-change source code. The pre-change source code is converted into a first code representation (e.g., based on a graph model), and the post-change source code into a second code representation. A first particle is generated from the first code representation, and a second particle is generated from the second code representation. The first particle and the second particle are compared to create a delta. The delta is transformed into a first commit vector by referencing an embedding matrix to numerically encode the first particle and the second particle. Following classification, the commit vector is stored in a data corpus for performing ML analysis upon source code.

20 Claims, 6 Drawing Sheets

(56) References Cited

U.S. PATENT DOCUMENTS

| | | | |
|---|---|---|---|
| 2021/0263728 A1* | 8/2021 | Farrier | G06F 11/3604 |
| 2021/0286598 A1* | 9/2021 | Luo | G06F 8/33 |
| 2021/0334096 A1* | 10/2021 | DeLuca | G06F 11/368 |
| 2021/0342143 A1* | 11/2021 | Kabra | G06F 11/34 |

OTHER PUBLICATIONS

Title: Commit Classification using Natural Language Processing: Experiments over Labeled Datasets. Author: GE dos Santos, published on 2020.*
Title: Reduce before you localize: Delta-debugging and spectrum-based fault localization; author: A Christi, published on 2018.*
Title: Recovering traceability links between source code and fixed bugs via patch analysis; author: CS Corley, published on 2011.*
Allamanis, et al. "A Survey of Machine Learning for Big Code and Naturalness", May 5, 2018, 36 pages.
Alon, et al. "Code2SEQ: Generating Sequences From Structured Representations of Code", Feb. 21, 2019, 22 pages.
Alon, et al. "Code2vec: Learning Distributed Representations of Code", Oct. 30, 2018, 30 pages.
Chen, et al. "A Literature Study of Embeddings on Source Code", Apr. 5, 2019, 8 pages.
Mikolov, et al. "Efficient Estimation of Word Representations in Vector Space", Sep. 7, 2013, 12 pages.
Yin, et al. "Learning to Represent Edits", Feb. 22, 2019, 22 pages.

* cited by examiner

| Variable | Description |
|---|---|
| $C$ | commit |
| AST | abstract syntax tree |
| $t_x$ | x-th terminal node in AST |
| $x \in [1..X]$ | for number of terminal-nodes in AST |
| $n_y$ | y-th non-terminal node in AST |
| $y \in [1..Y]$ | for number of non-terminal nodes in AST |
| $p_z$ | z-th path connecting two terminal nodes in AST |
| $z \in [1..Z]$ | for number of connecting paths in AST |
| $f_i$ | i-th file in commit |
| $i \in [1..I]$ | for number of code-relevant files in commit |
| $m_j$ | for methods |
| $j \in [1..J]$ | for number of modified methods in commit |
| $c$ | for contexts |
| $k \in [1..K]$ | for number of contexts in commit |

FIG. 4

DISTRIBUTED VECTORIZED REPRESENTATIONS OF SOURCE CODE COMMITS

BACKGROUND

Unless otherwise indicated herein, the approaches described in this section are not prior art to the claims in this application and are not admitted to be prior art by inclusion in this section.

Deep learning techniques have been an element in promising recent developments in the fields of computer vision, speech recognition, and natural language processing. These advances were possible due to the explosion of freely available data—on the order of millions or even hundreds of millions of samples.

Given the availability of mature, high-quality Open Source Software (OSS), code analysis could potentially benefit from deep learning techniques. However the effective representation of source code for machine learning applications, offers certain challenges.

SUMMARY

Embodiments generate distributed vector representations of commits of source code to a repository (such as GITHUB). Such source code commit representations can be part of a data corpus referenced by a machine learning (ML) process to perform tasks such as detecting specific source code changes (e.g., that introduce new features, fix bugs, or eliminate security vulnerabilities. In certain embodiments, a source code commit comprising source code, time information, and an associated label, is received. The time information is referenced to split the source code into pre-change source code and post-change source code. The pre-change source code is converted into a first code representation (e.g., based on text tokens or a graph model), and the post-change source code into a second code representation. A first particle is generated from the first code representation, and a second particle is generated from the second code representation. The first particle and the second particle are compared to create a delta. The delta is transformed into a first commit vector by referencing an embedding matrix to numerically encode the first particle and the second particle. Following classification of the commit vector, it is stored as a data corpus for the ML process.

The following detailed description and accompanying drawings provide a better understanding of the nature and advantages of various embodiments.

BRIEF DESCRIPTION OF THE DRAWINGS

FIG. 4 is a summary of the notation of various elements for the example.

DETAILED DESCRIPTION

Described herein are methods and apparatuses that implement the representation of code commits (e.g., for purposes of machine learning). In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Software repositories such as GitHub or Gitlab, host enormous volumes of source code. This source code—together with the historical record of changes also preserved by these repositories—is available for analysis and automated learning.

As an example, between September 2016 and the end of 2017, more than one billion public commits were pushed onto the GITHUB repository. The nature of these commits can vary in significance, all the way from small edits and improvements to the introduction of new features and important fixes of bugs and potential security vulnerabilities.

Embodiments as described herein can represent source code changes (commits) that can be used as input to implement downstream machine learning applications. For example, the commits as described herein can be used to perform one or more of:

distinguishing minor vs major fixes;

detecting changes of a specific type (e.g., introducing new features, fixing bugs, eliminating security vulnerabilities, etc.)

Embodiments can represent not only isolated static versions of methods, but also full commits. Such full commits can be made up of changes in multiple methods and in multiple files. Moreover, the representation of full commits can include a temporal component to capture changes between a certain code revision and subsequent revisions.

Figure 1:
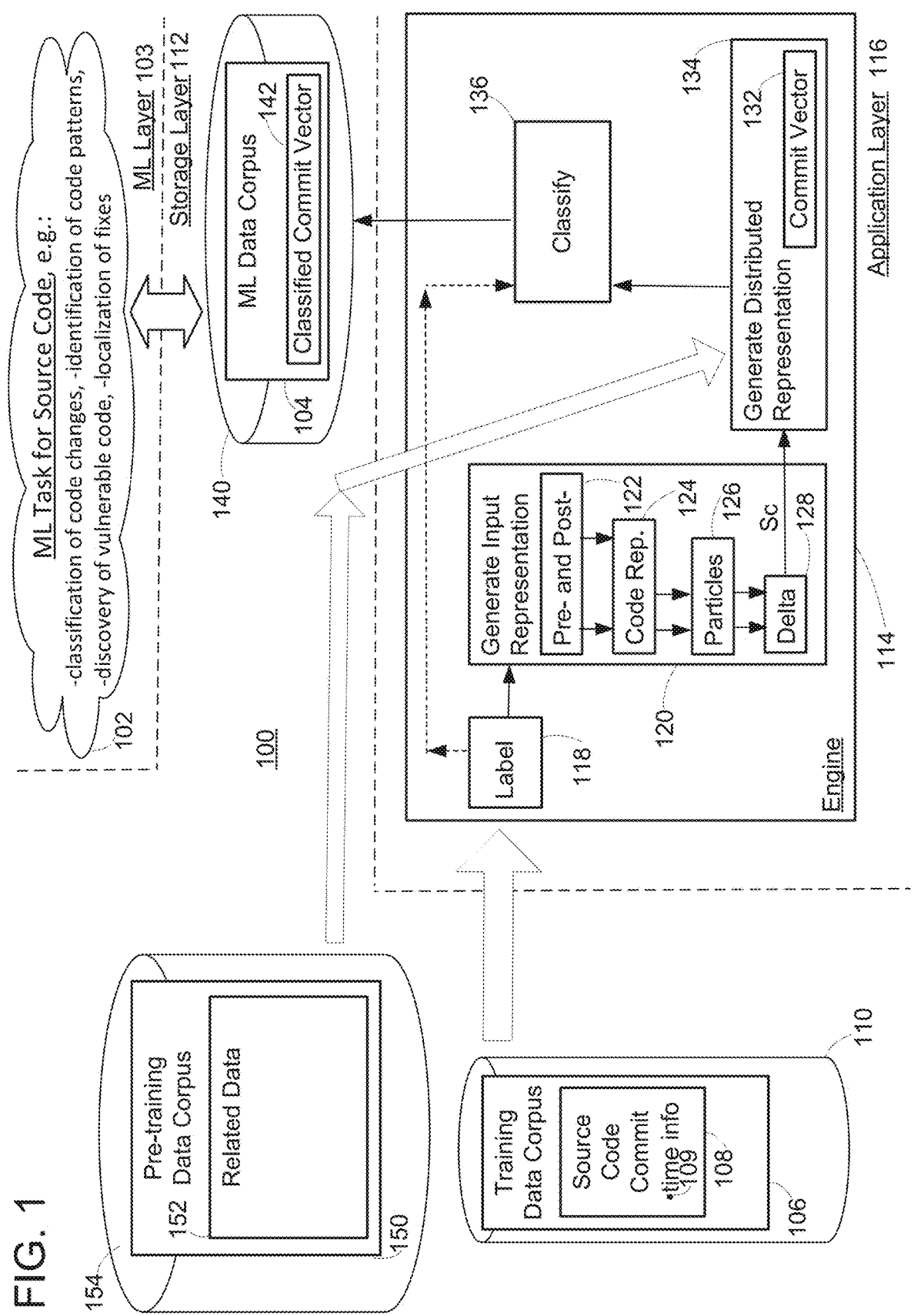
FIG. 1 shows a simplified diagram of a system according to an embodiment.

FIG. 1 shows a simplified view of an example system that is configured to implement the representation of code commits according to an embodiment. Specifically, system 100 comprises a target task 102 for a machine learning (ML) process that is located within a machine learning layer 103.

This ML task utilizes source code as input, and performs analysis thereon. Concrete examples of such ML tasks could be to, e.g.:

classify changes made in the source code that is input the ML task;

identify particular patterns in the source code that is input to the ML task;

discover the existence of security vulnerabilities in the source code input to the ML task; or determine the localization of fixes to the source code input to the ML task.

In order to accurately perform this ML task, a voluminous machine learning (ML) data corpus 104 containing outcomes (e.g., prior •classification, •identification, •discovery, or •determination of localization) of known accuracy, is to be available for reference by the target ML task. It is the role of embodiments as described herein, to provide this voluminous ML data corpus for reference by the target ML task.

Specifically, a training data corpus 106 comprising source code commits 108 (e.g., to GITHUB) exists, and is stored in non-transitory computer readable storage medium 110 of storage layer 112. In order to create the voluminous ML data corpus, these source code commits are communicated to processing engine 114 that is located in application layer 116.

In a first (optional) stage, the engine assigns labels 118 to the incoming source code commits from the training corpus. This stage is optional because under certain circumstances, the source code commits of the training data corpus may have already been stored with labels assigned thereto, upon relevance to the target ML task.

Next, the processing engine receives the labeled source code commits, and generates therefrom an input representation. As described herein, this input representation involves the splitting of the incoming labeled source code commits into pre- and post-changes 122. This splitting may be based upon time information 109 that is present in the commit data of the training corpus.

Next, representations 124 of both the pre- and post-changed source code are created. Examples of such source code representations can be text tokens or graphs.

Then, for each source code representation, particles 126 are generated. The smallest element in a given form of code representation is a particle. One form of exemplary particles are tokens in a token-based representation of source code.

Alternatively, other examples of particles can be nodes, connecting edges, or paths (or combinations of same) in a graph-based representation of source code. Such graph-based representations may be abstract syntax trees (ASTs), control-flow graphs (CFGs), data-flow graphs (DFGs), and combinations thereof, such as program dependence graphs (PDGs) and the like. One source of particles is CODE2VEC which uses ASTs as is described later in connection with the given example below.

Then, the particles of the pre- and post-change source code are compared to create a delta ($S_C$) 128. As described herein, embodiments may process not only isolated static versions of methods, but also full commits.

Such full source code commits can comprise changes in multiples methods, and in multiple files. Accurate generation of representations of such full commits, may include a temporal component—one which captures changes between an earlier (pre-) source code revision and a subsequent (post-) revision.

This delta is input to generate a distributed representation 134 in the form of commit vectors 132. The commit input representation $S_C$ is transformed to generate a compact distributed representation—referred to herein as a commit vector.

In particular, an embedding matrix may be used to numerically encode each particle in the $S_C$. For particles comprised of multiple elements (e.g., a node-path pair from a graph code representation), two embedding matrices can be used. The embedding matrices may be initialized from the vocabularies of the particles.

It is noted that the commit vector distributed representation, has the property of allowing for an evaluation of distances between samples. This facilitates the ability to cluster code changes by similarities.

Lastly, the distributed representation of commit vectors is subjected to a classification process 136. This classification reflects the relevance of the commit vector to the ML task.

The distributed representation generator is trained in conjunction with the classifier. Once the commit representation has been trained (e.g., using the large pre-training dataset—discussed below—of the pre-training task), the commit vector can be used as a feature vector in the classification of the ML task.

The choice of the classifier is open. In certain embodiments the classifier may be a simple, linear classifier. Alternatively a complex, highly non-linear classifier could be used.

In some embodiments, the distributed representation may be fixed. Alternatively, however the distributed representation may be fine-tuned and allowed to evolve.

This latter approach utilizes a similar architecture as that for the pre-training task (discussed below). If the ML task classifier is trained using backpropagation, the weights of the embeddings and attention layers can be further trained to be fine-tuned with the ML task dataset.

The resulting classified commit vector 142 is then stored as part of the (voluminous) ML data corpus in a non-transitory computer readable storage medium 140. That classified commit vector is now ready to be referenced by the target ML task during the process of accurately analyzing (e.g., •classifying, •identifying patterns, •detecting vulnerabilities, •others) newly-received source code having unknown outcomes.

It is noted that the ultimate accuracy of the ML task, may depend strongly upon the size of the ML data corpus. That is, the more examples of known outcome that are available to make up the data corpus, the more accurate the expected prediction by the target ML task.

However, the actual size of the training data corpus may be limited. And, it can be difficult to create the requisite large ML data corpus from such a small volume of original training data.

Accordingly, embodiments may enlarge the size of the ML data corpus by also performing a pre-training upon a larger volume of available data that is relevant to a similar, but not identical, related task. For example, this pre-training could be performed upon a pre-training data corpus 150 of software application service tickets for a pre-training ticket classification task, where the actual ML target task is to detect source code commits fixing a security vulnerability in that same software application.

Thus, FIG. 1 also shows the pre-training data corpus comprising source code commits of related data 152, stored within a non-transitory computer readable storage medium 154 located within the storage layer. As shown, this pre-training data corpus is input 156 to the processing engine for further consideration during the stage of generating the commit vector distributed representation.

Figure 2:
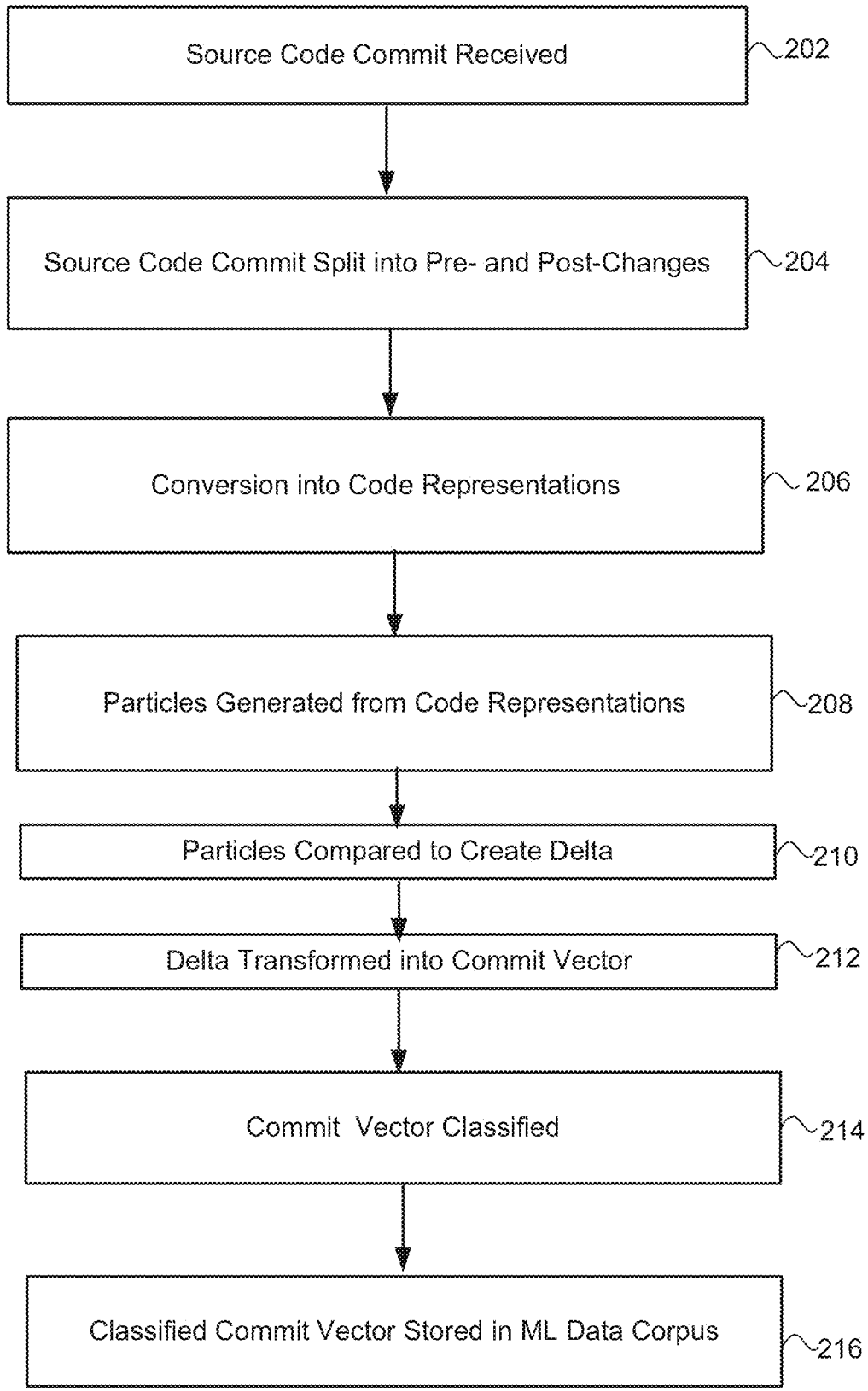
FIG. 2 shows a simplified flow diagram of a method according to an embodiment.

FIG. 2 is a flow diagram of a method 200 according to an embodiment. At 202, a source code commit is received comprising source code, time information, and a label associated based upon a machine learning target task.

At 204, the time information is referenced to split the source code into pre-change source code and post-change source code. At 206, the pre-change source code is converted into a first code representation (e.g., token, graph) and post-change source code is converted into a second code representation.

At 208, a first particle is generated from the first code representation, and a second particle is generated from the second code representation. At 210 the first particle and the second particle are compared to create a delta.

At 212, the delta is transformed into a first commit vector by referencing an embedding matrix to numerically encode the first particle and the second particle.

At 214, the first commit vector is classified according to the target task. At 216, the first classified commit vector is stored as part of a data corpus for performing the target task.

Further details regarding the representation of source code commits according to embodiments, are now provided in connection with the following example.

EXAMPLE

Depending on the target application, the ability to obtain databases of the necessary size can pose a challenging task on its own. This can be attributable to one or more of:

a scarcity of existing relevant data to serve as a training corpus, and/or the high cost of labeling relevant data that does exist.

Accordingly, particular embodiments may pre-train the network for generating commit representations, using a different (but related) pre-training task for which a large volume of data is in fact available. Once pre-trained, the model then can be fine-tuned for the actual target task using a considerably smaller database of commit information that is available for the actual task.

In this example, the actual task is to generate a commit representation useful in detecting source code commits that fix security vulnerabilities in a software application.

Figure 3:
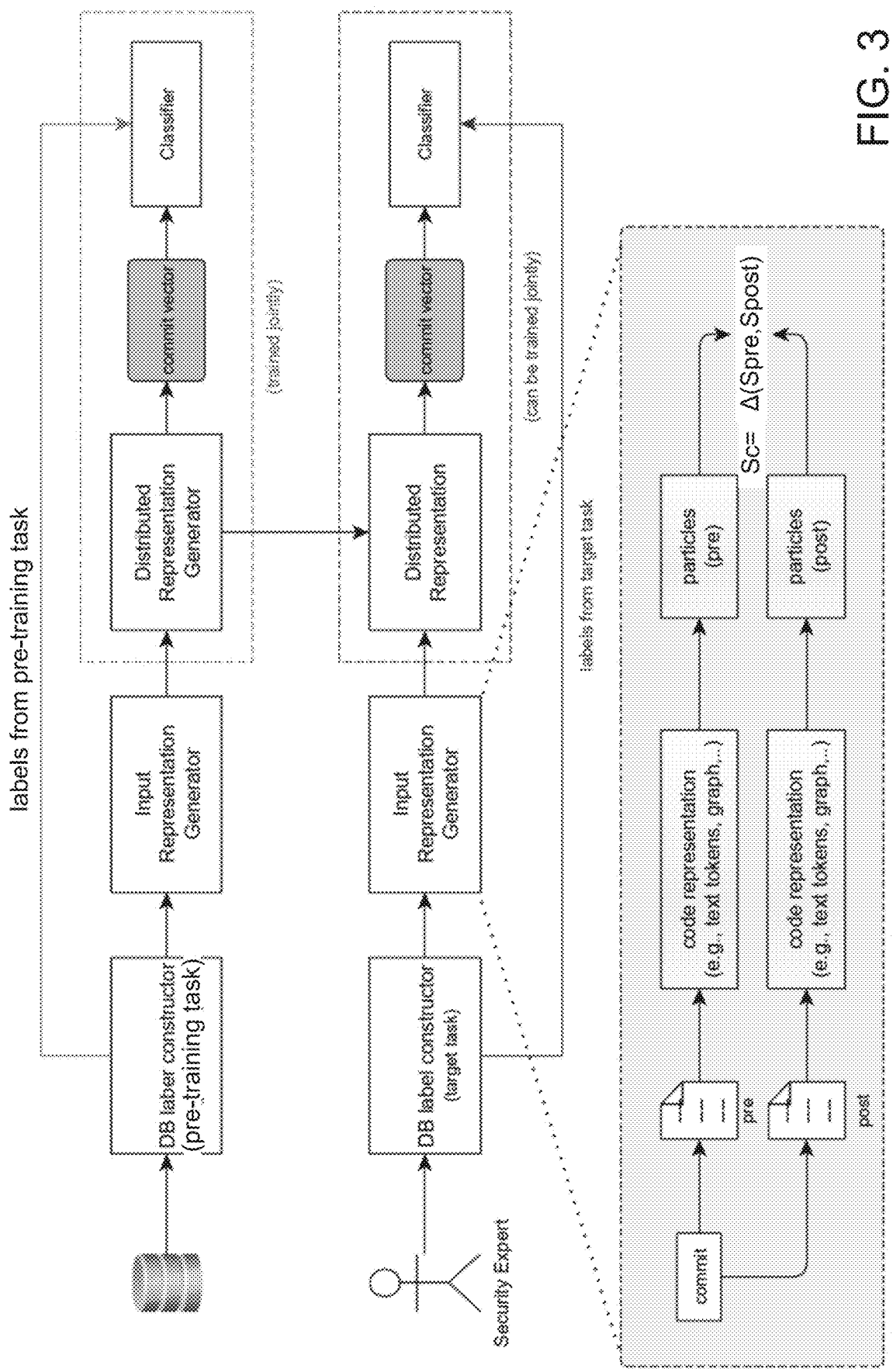
FIG. 3 is a simplified block diagram of an exemplary system.

FIG. 3 shows a simplified block diagram of system 300 generating commit representations in connection with this task.

FIG. 3 shows that only a relatively small (security expert) database 302 is available as a training corpus for accomplishing this actual task. Fortunately, a much larger volume of (related) data 304, is available in the form of support tickets submitted under the JIRA ticket tracking software offered by Atlassian Corporation Plc of Sydney, Australia.

Moreover, the JIRA software provides the voluminous database with freely available labels. In particular, the structure of JIRA support handling tickets stored in the database, may include at least as follows.

Identifier (e.g., a unique project identifier concatenated with a sequence number).

Type: bug, task, question, improvement, etc.

Priority: No Ticket. Trivial, Minor, Major, Critical and Blocker.

Description: A written explanation of the ticket in plain natural language.

Discussion: A discussion of users about this issue (a series of comments).

This data offers a wealth of information for use in assigning labels for pre-training purposes. Hence the accurate classification of different elements (such as priority or type) in a bug handling ticket, can be used as the pre-training task.

The availability of a large database of sample data to learn from, is called for in order to practice embodiments as described herein. Where labels are not already available, such a large database can be preprocessed to automatically associate a label to each item.

After such labeling, the database can be used to train a model on a pre-training task. The label constructor is responsible for implementing a labeling strategy, whereby each item in the database is associated with a label. Depending on the database type, certain labels can already be readily available (explicit) or can be implicit.

If the pre-training task is "learning to assign tickets to the correct priority class", the labeling function is trivial because the priority is actually explicit in the data. However, other labeling functions can be implemented (e.g., using another machine-learning model that predicts some feature of a ticket, or using a procedure that computes features.)

Source code commits can be related to tickets by including a ticket identifier in the commit message. Thus, by crawling source code repositories, it is possible to construct a dataset of commits that are mapped onto the corresponding bug handling support tickets. A commit linked to a ticket is considered as the fix of the issue described in the ticket.

In this particular example, a useful pre-training task is the prediction of ticket priority based on the content of the related commit. However this is not required, and other elements of the ticket could be used as the source of information in order to provide labels.

Details regarding the Input Representation Generator element of the exemplary system of FIG. 3, are now provided. We define a code-relevant file, $f \in F$, as one with an extension of the programming language of a given project (e.g. java for JAVA, .py for PYTHON, or .rb for RUBY). Under this definition, text files with .txt extension and other non-code relevant files are not included in F.

Let a code commit, C, be defined as a change in the source code of a given project in a file $f_i \in F$, where $i \in [1 \ldots I]$ with I being the total number of code-relevant files changed within C. Non-code changes such as inclusion, removal, or modification of comments in $f_i$ are not considered code commits.

The concept of a commit implies an anterior and a posterior version of files $f_i$ before and after the implementation of the commit, $f_{i,pre}$ and $f_{i,post}$. We define the smallest element in a given form of code representation as a particle.

One example of particles are tokens in a token-based representation of code. Other particle examples are nodes, connecting edges, paths, or a combination of thereof in graph-based representations.

One example of a graph-based representation is an Abstract Syntax Tree (AST).

Other examples include control-flow graphs (CFGs), data-flow graphs (DFGs), and combinations thereof, such as program dependence graphs (PDGs) and others.

Here, for $j \in [1 \ldots J]$ with J being the number of methods changed in a commit C, we let the union of all the particles describing the anterior versions of all methods $m_{1 \ldots J,pre}$ in all files $f_{1 \ldots I,pre}$ in commit C be defined as:

$$S_{pre} = \{p_1, p_2, \ldots p_k\}$$

and the union of the particles describing the posterior versions of all methods $m_{1 \ldots J,post}$ in all files $f_{1 \ldots I,post}$ in commit C be defined as:

$$S_{post} = \{p_1, p_2, \ldots, p_k\}$$

We then define the set of particles describing commit C as the symmetric difference between $S_{pre}$ and $S_{post}$:

$$S_C = S_{pre} \Delta S_{post} = \{p : p \notin S_{pre} \cap S_{post}\}$$

The quantity $S_C$ will then be the input provided to the neural network architecture which will generate a distributed representation of the code changes performed in commit C.

Details regarding the Distributed Representation Generator of the exemplary system of FIG. 3 are now discussed. The role of this component is to transform the commit input representation $S_C$ described above, and to generate a compact distributed representation—the commit vector.

The maximum number of particles contained in $S_C$ can be chosen empirically. Elements with fewer particles can be padded; those with more particles can be cropped.

Next, an embedding matrix is used to numerically encode each particle in $S_C$. Where particles are composed of multiple elements (e.g., a pair of node-path from a graph code representation) then two embedding matrices will be used.

The embedding matrices are initialized from the particles' vocabularies. The size of the embeddings can vary (traditionally this value ranges from 50 to 500 dimensions depending on the application).

For particles composed of pairs or triplets of elements, the embeddings of these elements will be concatenated. Otherwise, the resulting embedding will be passed through a single or a series of fully connected layers with tan h or sigmoid activation functions.

Finally, a global attention mechanism will aggregate the resulting vectors and will create a commit vector.

The distributed representation generator is trained in conjunction with a classifier. Details regarding the pre-text Task Classifier component of the exemplary system of FIG. 3 are now discussed.

A final layer connects the commit vector to the classification output to be used to compute the loss. Here, this exemplary embodiment uses a layer whose size corresponds to the number of classes for the pre-text task.

Given that the related task used for pre-training is the prediction of severity of a JIRA support ticket, this could result in a six-class layer corresponding to the following six ticket priority levels:

No ticket,
Trivial,
Minor,
Major,
Critical, and
Blocker.

The training set is used to fit the model parameters. The validation set is used for the hyperparameter tuning. The test set is used to objectively assess the performance of the classifier.

Regarding the Target Task Classifier of FIG. 3, once the commit representation has been trained using the large dataset of the pre-text task, the commit vector can be used as a feature vector in the target classification task.

A variety of classifiers could possibly be used. Such classifiers can range from simple linear classifiers to complex highly non-linear ones.

Furthermore, in some embodiments the representation may be fixed. Alternatively, the representation may be fine-tuned and allowed to evolve.

This latter approach involves a similar architecture as of the pre-text task. If the target task classifier is trained using backpropagation, the weights of the embeddings and attention layers can be further trained to be fine-tuned with the target task dataset.

The instant example uses CODE2VEC as the source of particles for a model capable of learning distributed representations of source code. This model takes as input, pre-processed method bodies in the form of a collection of paths joining any two terminal nodes in the abstract syntax tree (AST).

These triplets (called contexts) are embedded. Then, they are aggregated using attention mechanisms and transformed into a fixed-length vector (called a code-vector). This vector is a distributed representation describing in a compact manner the contents of the method body.

However, it is noted that embodiments are not dependent on a specific abstraction of code (e.g., an AST as in the case of CODE2VEC). Different abstract code models (such as text-based or graph-based representations other than AST) may alternatively be used in conjunction with various embodiments.

In this particular example, however, we exemplify the creation of $S_C$ with a tree-based representation of code derived from ASTs, which is a representation of the syntactic structure of source code written in a programming language. FIG. 4 is a summary of notation of elements for the example.

In particular, CODE2VEC introduces a series of concepts that arise from the need to traverse the AST representing a code snippet, or method (here denoted as M).

The following lists some concepts referred to in the instant example. $AST_M$ is the abstract syntax tree representing the method M.

Also, $t_x \in T$ and $n_y \in N$ are the terminal and non-terminal nodes in an AST. Here, $x \in [1 \ldots X]$ where X is the number of terminal nodes in the AST and with $y \in [1 \ldots Y]$ where Y is the number of non-terminal nodes in the AST.

Here, $p_z \in P$ represents the paths connecting a pair of terminal nodes in the AST, with $z \in [1 \ldots Z]$ where Z is the number of connecting paths.

A context c is a triplet containing two terminal nodes and the path connecting them $<t_s, p, t_f>$. The values $t_s$ and $t_f$ represent the start and final terminals concerned.

In this example we represent a commit (C) which can contain multiple modified methods, $m_j \in M$, for $j \in [1 \ldots J]$, located in multiple files, $f_i \in F$, for $i \in [1 \ldots I]$.

According to the previously defined representation, the CODE2VEC contexts represent the particles. $S_C$ will be the symmetric difference (i.e., the union minus the intersection) between the set of contexts in $S_{pre}$ and $S_{post}$.

Each particle in $S_C$ is a context composed of two terminal nodes and their connecting path. But, the nature of the particles is defined by the type of code representation chosen.

In this specific example, two embedding matrices are initialized from the terminal nodes and paths vocabularies. The size of both the token and path embeddings can vary. Traditionally this value ranges from 50 to 500 dimensions depending on the application. This example chose to set the value to 128. The size of $S_C$ is not restricted, and embodiments permit a size larger than 200 due to the difference in the nature of the task.

Indeed, aiming to represent a code commit which can be composed of changes in multiple methods in multiple files will generally require a larger number of contexts than representing single methods. Here, it was found that using up to 400 contexts can improve the quality of the representation.

In this specific example, the three embeddings of the contexts in $S_C$ are concatenated to a single context vector of size 384. Each context vector is then propagated to a fully connected layer with a tan h activation function producing a vector of size 128.

The sizes of the context vector and the code vector can vary. Also, the activation functions for each layer can vary.

Finally, a global attention mechanism aggregates the resulting vectors and creates the commit vector. The distributed representation generator is trained in conjunction with the classifier.

Returning now to FIG. 1, there the particular embodiment is depicted with the engine responsible for representing source code commits, as being located outside of the database. However, this is not required.

Rather, alternative embodiments could leverage the processing power of an in-memory database engine (e.g., the in-memory database engine of the HANA in-memory database available from SAP SE), in order to perform various functions. These functions can include but are not limited to labeling, particle generation, delta comparison, generating the distributed representation, and/or classification. Such an in-memory database could be used to store one or more of a training data corpus, a pre-training corpus, and a target data corpus.

Figure 5:
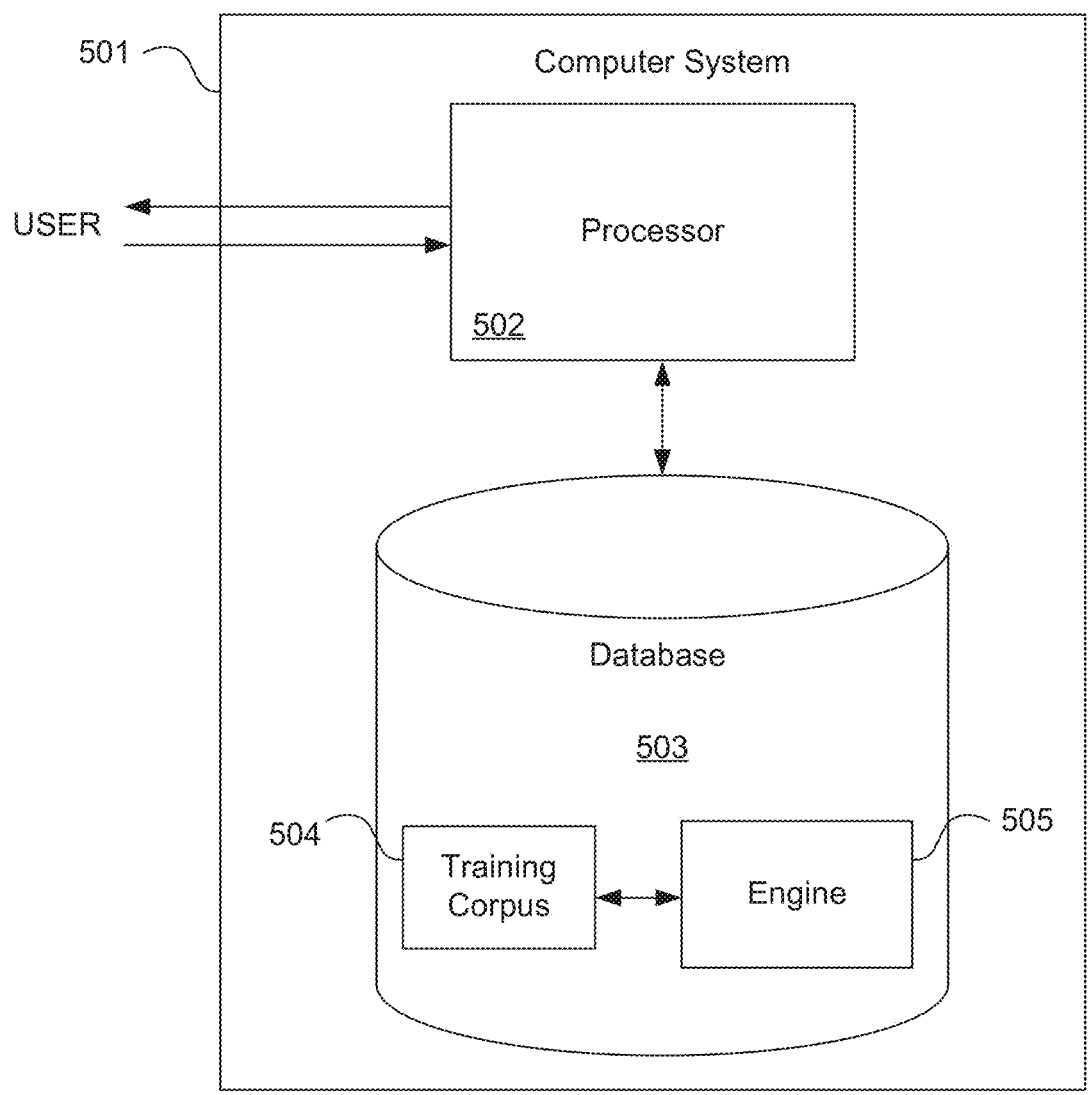
FIG. 5 illustrates hardware of a special purpose computing machine according to an embodiment, that is configured to implement the representation of source code commits.

Thus FIG. 5 illustrates hardware of a special purpose computing machine configured to generate vector representations of commits of source code according to an embodiment. In particular, computer system 501 comprises a processor 502 that is in electronic communication with a non-transitory computer-readable storage medium comprising a database 503. This computer-readable storage medium has stored thereon code 505 corresponding to an engine. Code 504 corresponds to a training corpus. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
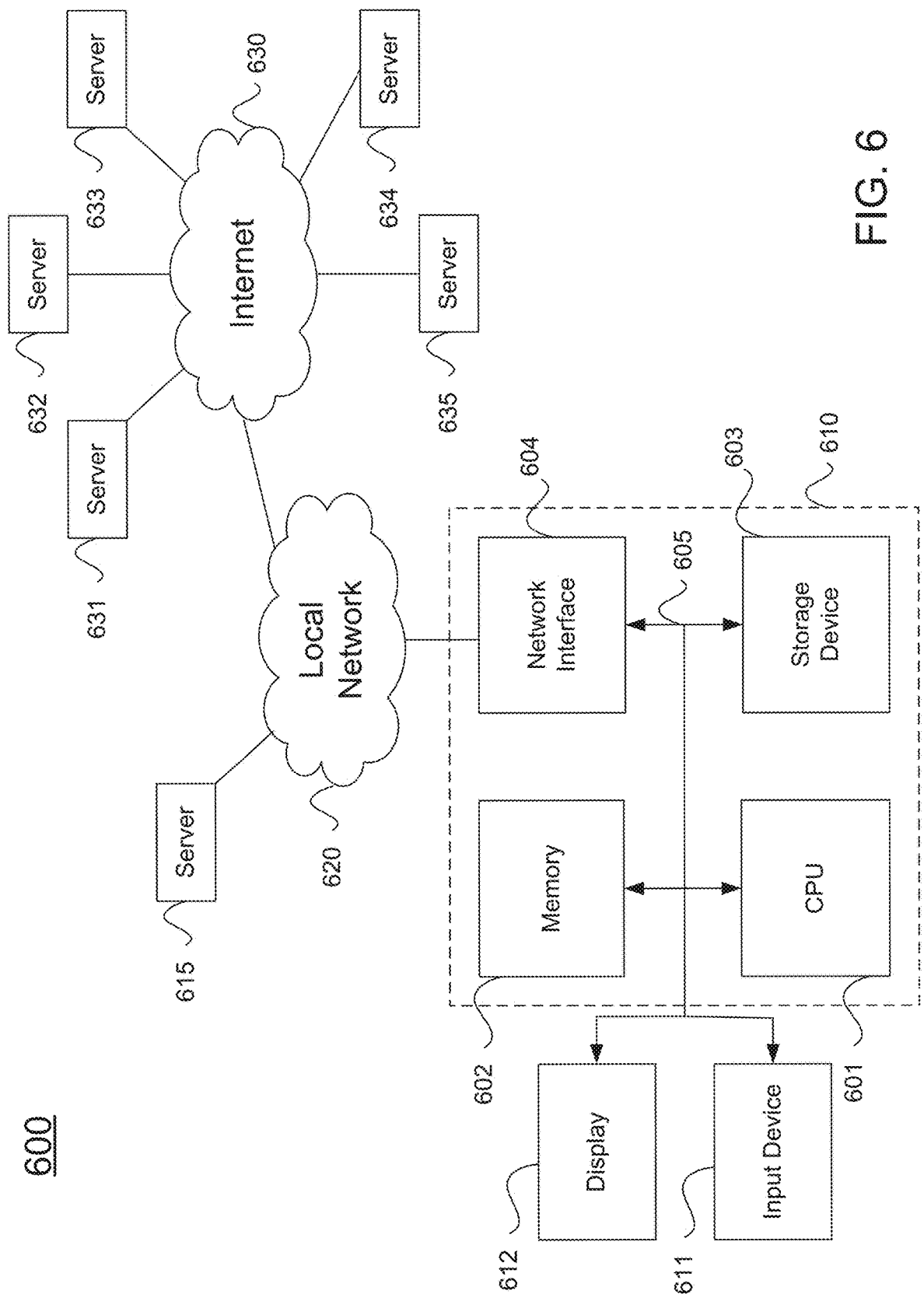
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    receiving a source code commit comprising source code, time information, and a label associated based upon a machine learning target task regarding a security vulnerability in the source code, a fix to a bug in the source code, or a new feature in the source code;
    referencing the time information to split the source code into pre-change source code and post-change source code;
    converting the pre-change source code into a first code representation;
    converting the post-change source code into a second code representation;
    generating a plurality of first particles from the first code representation, a particle being a smallest element in a given form of code representation;
    generating a plurality of second particles from the second code representation;
    comparing the plurality of first particles and the plurality of second particles to create a delta;
    transforming the delta into a first commit vector by referencing an embedding matrix to numerically encode particles of the delta;
    classifying the first commit vector according to the machine learning target task; and
    storing the first classified commit vector in a non-transitory computer readable storage medium.

2. A method as in claim 1 wherein the first code representation and the second code representation use text tokens.

3. A method as in claim 1 wherein the first code representation and the second code representation use a graph model.

4. A method as in claim 3 wherein the graph model is an Abstract Syntax Tree (AST).

5. A method as in claim 4 wherein the graph model is a combination of graph representations.

6. A method as in claim 1 wherein the source code commit is part of a training corpus having a first volume, the method further comprising:
    generating a second commit vector from a pre-training corpus having second volume larger than the first volume;
    classifying the second commit vector according to a pre-training task related to the machine learning target task; and
    storing the classified second commit vector in the non-transitory computer readable storage medium.

7. A method as in claim 6 further comprising using backpropagation to train a classifier to perform the classification of the first commit vector.

8. A method as in claim 1 further comprising:
prior to the receiving, associating the label with the source code commit according to the machine learning target task.

9. A method as in claim 1 wherein:
the non-transitory computer readable storage medium comprises an in-memory database; and
the transforming is performed by an in-memory database engine of the in-memory database.

10. A non-transitory computer readable storage medium embodying a computer program for performing a method, said method comprising:
receiving a source code commit comprising source code, time information, and a label associated based upon a machine learning target task regarding a security vulnerability in the source code, a fix to a bug in the source code, or a new feature in the source code;
referencing the time information to split the source code into pre-change source code and post-change source code;
converting the pre-change source code into a first graph representation;
converting the post-change source code into a second graph representation;
generating a plurality of first particles from the first graph representation, a particle being a smallest element in a given form of code representation;
generating a plurality of second particles from the second graph representation;
comparing the plurality of first particles and the plurality of second particles to create a delta;
transforming the delta into a first commit vector by referencing an embedding matrix to numerically encode particles of the delta;
classifying the first commit vector according to the machine learning target task; and
storing the first classified commit vector in a non-transitory computer readable storage medium.

11. A non-transitory computer readable storage medium as in claim 10 wherein the first graph representation is:
an Abstract Syntax Tree (AST);
a Control-Flow Graph (CFG);
a Data-Flow Graph (DFGs); or
a combination of at least two of an AST, a CFG, and a DFG.

12. A non-transitory computer readable storage medium as in claim 10 wherein the source code commit is part of a training corpus having a first volume, and the method further comprises:
generating a second commit vector from a pre-training corpus having second volume larger than the first volume;
classifying the second commit vector according to a pre-training task related to the machine learning target task; and
storing the classified second commit vector in the non-transitory computer readable storage medium.

13. A non-transitory computer readable storage medium as in claim 12 wherein the method further comprises:
using backpropagation to train a classifier to perform the classification of the first commit vector.

14. A non-transitory computer readable storage medium as in claim 10 wherein the method further comprises:
prior to the receiving, associating the label with the source code commit according to the machine learning target task.

15. A computer system comprising:
one or more processors;
a software program, executable on said computer system, the software program configured to cause an in-memory database engine of an in-memory database to:
receive a source code commit comprising source code, time information, and a label associated based upon a machine learning target task regarding a security vulnerability in the source code, a fix to a bug in the source code, or a new feature in the source code;
reference the time information to split the source code into pre-change source code and post-change source code;
convert the pre-change source code into a first code representation;
convert the post-change source code into a second code representation;
generate a plurality of first particles from the first code representation, a particle being a smallest element in a given form of code representation;
generate a plurality of second particles from the second code representation;
compare the plurality of first particles and the plurality of second particles to create a delta;
transform the delta into a first commit vector by referencing an embedding matrix to numerically encode particles of the delta;
classify the first commit vector according to the machine learning target task; and
store the first classified commit vector in the in-memory database.

16. A computer system as in claim 15 wherein first code representation and the second code representation use text tokens.

17. A computer system as in claim 15 wherein the first code representation and the second code representation use a graph model.

18. A computer system as in claim 17 wherein the graph model is:
an Abstract Syntax Tree (AST);
a Control-Flow Graph (CFG);
a Data-Flow Graph (DFGs); or
a combination of at least two of an AST, a CFG, and a DFG.

19. A computer system as in claim 15 wherein the source code commit is part of a training corpus having a first volume, and the in-memory database engine is further configured to:
generate a second commit vector from a pre-training corpus having second volume larger than the first volume;
classify the second commit vector according to a pre-training task related to the machine learning target task; and
store the classified second commit vector in the non-transitory computer readable storage medium.

20. A computer system as in claim 19 wherein the in-memory storage engine is further configured to use backpropagation to train a classifier to perform the classification of the first commit vector.

* * * * *